(12) United States Patent
Shalev

(10) Patent No.: US 11,847,320 B2
(45) Date of Patent: *Dec. 19, 2023

(54) REASSIGNMENT OF REQUESTS FOR HIGH AVAILABILITY

(71) Applicant: Pure Storage, Inc., Mountain View, CA (US)

(72) Inventor: Ori Shalev, Sunnyvale, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,330

(22) Filed: Dec. 19, 2022

(65) Prior Publication Data

US 2023/0118086 A1 Apr. 20, 2023

Related U.S. Application Data

(63) Continuation of application No. 16/845,922, filed on Apr. 10, 2020, now Pat. No. 11,550,473, which is a continuation of application No. 16/298,772, filed on Mar. 11, 2019, now Pat. No. 10,649,659, which is a continuation of application No. 15/145,737, filed on May 3, 2016, now Pat. No. 10,261,690.

(51) Int. Cl.
*G06F 3/06* (2006.01)

(52) U.S. Cl.
CPC ............ *G06F 3/0605* (2013.01); *G06F 3/067* (2013.01); *G06F 3/0635* (2013.01); *G06F 3/0647* (2013.01); *G06F 3/0653* (2013.01); *G06F 3/0658* (2013.01); *G06F 3/0659* (2013.01); *G06F 3/0683* (2013.01)

(58) Field of Classification Search
CPC .... G06F 3/0605; G06F 3/0635; G06F 3/0647; G06F 3/0653; G06F 3/0658; G06F 3/0659; G06F 3/067; G06F 3/0683
See application file for complete search history.

(56) References Cited

U.S. PATENT DOCUMENTS

| 5,390,327 A | 2/1995 | Lubbers et al. |
| 5,450,581 A | 9/1995 | Bergen et al. |
| 5,479,653 A | 12/1995 | Jones |

(Continued)

FOREIGN PATENT DOCUMENTS

| EP | 2164006 | 3/2010 |
| EP | 2256621 | 12/2010 |

(Continued)

OTHER PUBLICATIONS

Hwang, Kai, et al. "RAID-x: A New Distributed Disk Array for I/O-Centric Cluster Computing," HPDC '00 Proceedings of the 9th IEEE International Symposium on High Performance Distributed Computing, IEEE, 2000, pp. 279-286.

(Continued)

*Primary Examiner* — Khoa D Doan

(57) ABSTRACT

A method of operating a storage system is disclosed. The method includes determining a storage cluster among storage arrays of the storage system. Each storage array includes at least two controllers and at least one storage shelf. The at least two controllers are configured to function as both a primary controller for a first storage array and a secondary controller for a second storage array.

19 Claims, 10 Drawing Sheets

(56) References Cited

U.S. PATENT DOCUMENTS

| | | |
|---|---|---|
| 5,488,731 A | 1/1996 | Mendelsohn |
| 5,504,858 A | 4/1996 | Ellis et al. |
| 5,564,113 A | 10/1996 | Bergen et al. |
| 5,574,882 A | 11/1996 | Menon et al. |
| 5,649,093 A | 7/1997 | Hanko et al. |
| 5,883,909 A | 3/1999 | Dekoning et al. |
| 6,000,010 A | 12/1999 | Legg |
| 6,260,156 B1 | 7/2001 | Garvin et al. |
| 6,269,453 B1 | 7/2001 | Krantz |
| 6,275,898 B1 | 8/2001 | DeKoning |
| 6,453,428 B1 | 9/2002 | Stephenson |
| 6,523,087 B2 | 2/2003 | Busser |
| 6,535,417 B2 | 3/2003 | Tsuda |
| 6,643,748 B1 | 11/2003 | Wieland |
| 6,725,392 B1 | 4/2004 | Frey et al. |
| 6,763,455 B2 | 7/2004 | Hall |
| 6,836,816 B2 | 12/2004 | Kendall |
| 6,985,995 B2 | 1/2006 | Holland et al. |
| 7,032,125 B2 | 4/2006 | Holt et al. |
| 7,047,358 B2 | 5/2006 | Lee et al. |
| 7,051,155 B2 | 5/2006 | Talagala et al. |
| 7,055,058 B2 | 5/2006 | Lee et al. |
| 7,065,617 B2 | 6/2006 | Wang |
| 7,069,383 B2 | 6/2006 | Yamamoto et al. |
| 7,076,606 B2 | 7/2006 | Orsley |
| 7,107,480 B1 | 9/2006 | Moshayedi et al. |
| 7,159,150 B2 | 1/2007 | Kenchammana-Hosekote et al. |
| 7,162,575 B2 | 1/2007 | Dalal et al. |
| 7,164,608 B2 | 1/2007 | Lee |
| 7,188,270 B1 | 3/2007 | Nanda et al. |
| 7,334,156 B2 | 2/2008 | Land et al. |
| 7,370,220 B1 | 5/2008 | Nguyen et al. |
| 7,386,666 B1 | 6/2008 | Beauchamp et al. |
| 7,398,285 B2 | 7/2008 | Kisley |
| 7,424,498 B1 | 9/2008 | Patterson |
| 7,424,592 B1 | 9/2008 | Karr |
| 7,444,532 B2 | 10/2008 | Masuyama et al. |
| 7,480,658 B2 | 1/2009 | Heinla et al. |
| 7,484,056 B2 | 1/2009 | Madnani et al. |
| 7,484,057 B1 | 1/2009 | Madnani et al. |
| 7,484,059 B1 | 1/2009 | Ofer et al. |
| 7,523,286 B2 * | 4/2009 | Ramany ............ G06F 3/0653 711/170 |
| 7,536,506 B2 | 5/2009 | Ashmore et al. |
| 7,558,859 B2 | 7/2009 | Kasiolas |
| 7,565,446 B2 | 7/2009 | Talagala et al. |
| 7,613,947 B1 | 11/2009 | Coatney |
| 7,634,617 B2 | 12/2009 | Misra |
| 7,634,618 B2 | 12/2009 | Misra |
| 7,681,104 B1 | 3/2010 | Sim-Tang et al. |
| 7,681,105 B1 | 3/2010 | Sim-Tang et al. |
| 7,681,109 B2 | 3/2010 | Yang et al. |
| 7,730,257 B2 | 6/2010 | Franklin |
| 7,730,258 B1 | 6/2010 | Smith |
| 7,730,274 B2 | 6/2010 | Usgaonkar |
| 7,743,276 B2 | 6/2010 | Jacobsen et al. |
| 7,752,489 B2 | 7/2010 | Deenadhayalan et al. |
| 7,757,038 B2 | 7/2010 | Kitahara |
| 7,757,059 B1 | 7/2010 | Ofer et al. |
| 7,778,960 B1 | 8/2010 | Chatterjee et al. |
| 7,783,955 B2 | 8/2010 | Haratsch et al. |
| 7,814,272 B2 | 10/2010 | Barrall et al. |
| 7,814,273 B2 | 10/2010 | Barrall |
| 7,818,531 B2 | 10/2010 | Barrall |
| 7,827,351 B2 | 11/2010 | Suetsugu et al. |
| 7,827,439 B2 | 11/2010 | Matthew et al. |
| 7,831,768 B2 | 11/2010 | Ananthamurthy et al. |
| 7,856,583 B1 | 12/2010 | Smith |
| 7,870,105 B2 | 1/2011 | Arakawa et al. |
| 7,873,878 B2 | 1/2011 | Belluomini et al. |
| 7,885,938 B1 | 2/2011 | Greene et al. |
| 7,886,111 B2 | 2/2011 | Klemm et al. |
| 7,908,448 B1 | 3/2011 | Chatterjee et al. |
| 7,916,538 B2 | 3/2011 | Jeon et al. |
| 7,921,268 B2 | 4/2011 | Jakob |
| 7,930,499 B2 | 4/2011 | Duchesne |
| 7,941,697 B2 | 5/2011 | Mathew et al. |
| 7,958,303 B2 | 6/2011 | Shuster |
| 7,971,129 B2 | 6/2011 | Watson |
| 7,975,115 B2 | 7/2011 | Wayda |
| 7,984,016 B2 | 7/2011 | Kisley |
| 7,991,822 B2 | 8/2011 | Bish et al. |
| 8,006,126 B2 | 8/2011 | Deenadhayalan et al. |
| 8,010,485 B1 | 8/2011 | Chatterjee et al. |
| 8,010,829 B1 | 8/2011 | Chatterjee et al. |
| 8,020,047 B2 | 9/2011 | Courtney |
| 8,046,548 B1 | 10/2011 | Chatterjee et al. |
| 8,051,361 B2 | 11/2011 | Sim-Tang et al. |
| 8,051,362 B2 | 11/2011 | Li et al. |
| 8,074,038 B2 | 12/2011 | Lionetti et al. |
| 8,082,393 B2 | 12/2011 | Galloway et al. |
| 8,086,603 B2 | 12/2011 | Nasre et al. |
| 8,086,634 B2 | 12/2011 | Mimatsu |
| 8,086,911 B1 | 12/2011 | Taylor |
| 8,090,837 B2 | 1/2012 | Shin et al. |
| 8,108,502 B2 | 1/2012 | Tabbara et al. |
| 8,117,388 B2 | 2/2012 | Jernigan, IV |
| 8,117,521 B2 | 2/2012 | Yang et al. |
| 8,140,821 B1 | 3/2012 | Raizen et al. |
| 8,145,838 B1 | 3/2012 | Miller et al. |
| 8,145,840 B2 | 3/2012 | Koul et al. |
| 8,175,012 B2 | 5/2012 | Haratsch et al. |
| 8,176,360 B2 | 5/2012 | Frost et al. |
| 8,176,405 B2 | 5/2012 | Hafner et al. |
| 8,180,855 B2 | 5/2012 | Aiello et al. |
| 8,200,922 B2 | 6/2012 | McKean et al. |
| 8,209,469 B2 | 6/2012 | Carpenter et al. |
| 8,225,006 B1 | 7/2012 | Karamcheti |
| 8,239,618 B2 | 8/2012 | Kotzur et al. |
| 8,244,999 B1 | 8/2012 | Chatterjee et al. |
| 8,261,016 B1 | 9/2012 | Goel |
| 8,271,455 B2 | 9/2012 | Kesselman |
| 8,285,686 B2 | 10/2012 | Kesselman |
| 8,305,811 B2 | 11/2012 | Jeon |
| 8,315,999 B2 | 11/2012 | Chatley et al. |
| 8,327,080 B1 | 12/2012 | Der |
| 8,335,769 B2 | 12/2012 | Kesselman |
| 8,341,118 B2 | 12/2012 | Drobychev et al. |
| 8,351,290 B1 | 1/2013 | Huang et al. |
| 8,364,920 B1 | 1/2013 | Parkison et al. |
| 8,365,041 B2 | 1/2013 | Chu et al. |
| 8,375,146 B2 | 2/2013 | Sinclair |
| 8,397,016 B2 | 3/2013 | Talagala et al. |
| 8,402,152 B2 | 3/2013 | Duran |
| 8,412,880 B2 | 4/2013 | Leibowitz et al. |
| 8,423,739 B2 | 4/2013 | Ash et al. |
| 8,429,436 B2 | 4/2013 | Filingim et al. |
| 8,452,928 B1 | 5/2013 | Ofer et al. |
| 8,473,698 B2 | 6/2013 | Lionetti et al. |
| 8,473,778 B2 | 6/2013 | Simitci |
| 8,473,815 B2 | 6/2013 | Yu et al. |
| 8,479,037 B1 | 7/2013 | Chatterjee et al. |
| 8,484,414 B2 | 7/2013 | Sugimoto et al. |
| 8,495,472 B1 | 7/2013 | Magerramov |
| 8,498,967 B1 | 7/2013 | Chatterjee et al. |
| 8,504,797 B2 | 8/2013 | Mimatsu |
| 8,522,073 B2 | 8/2013 | Cohen |
| 8,533,408 B1 | 9/2013 | Madnani et al. |
| 8,533,527 B2 | 9/2013 | Daikokuya et al. |
| 8,539,177 B1 | 9/2013 | Ofer et al. |
| 8,544,029 B2 | 9/2013 | Bakke et al. |
| 8,549,224 B1 | 10/2013 | Zeryck et al. |
| 8,583,861 B1 | 11/2013 | Ofer et al. |
| 8,589,625 B2 | 11/2013 | Colgrove et al. |
| 8,595,455 B2 | 11/2013 | Chatterjee et al. |
| 8,615,599 B1 | 12/2013 | Takefman et al. |
| 8,627,136 B2 | 1/2014 | Shankar et al. |
| 8,627,138 B1 | 1/2014 | Clark |
| 8,639,669 B1 | 1/2014 | Douglis et al. |
| 8,639,863 B1 | 1/2014 | Kanapathippillai et al. |
| 8,640,000 B1 | 1/2014 | Cypher |
| 8,650,343 B1 | 2/2014 | Kanapathippillai et al. |
| 8,660,131 B2 | 2/2014 | Vermunt et al. |
| 8,661,218 B1 | 2/2014 | Piszczek et al. |

(56) References Cited

U.S. PATENT DOCUMENTS

| | | |
|---|---|---|
| 8,671,072 B1 | 3/2014 | Shah et al. |
| 8,689,042 B1 | 4/2014 | Kanapathippillai et al. |
| 8,700,875 B2 | 4/2014 | Barron et al. |
| 8,706,694 B2 | 4/2014 | Chatterjee et al. |
| 8,706,914 B2 | 4/2014 | Duchesneau |
| 8,706,932 B1 | 4/2014 | Kanapathippillai et al. |
| 8,712,963 B1 | 4/2014 | Douglis et al. |
| 8,713,405 B2 | 4/2014 | Healey et al. |
| 8,719,621 B1 | 5/2014 | Karmarkar |
| 8,725,730 B2 | 5/2014 | Keeton et al. |
| 8,751,859 B2 | 6/2014 | Becker-szendy et al. |
| 8,756,387 B2 | 6/2014 | Frost et al. |
| 8,762,793 B2 | 6/2014 | Grube et al. |
| 8,838,541 B2 | 6/2014 | Camble et al. |
| 8,769,232 B2 | 7/2014 | Suryabudi et al. |
| 8,775,858 B2 | 7/2014 | Gower et al. |
| 8,775,868 B2 | 7/2014 | Colgrove et al. |
| 8,788,913 B1 | 7/2014 | Xin et al. |
| 8,793,447 B2 | 7/2014 | Usgaonkar et al. |
| 8,799,746 B2 | 8/2014 | Baker et al. |
| 8,819,311 B2 | 8/2014 | Liao |
| 8,819,383 B1 | 8/2014 | Jobanputra et al. |
| 8,822,155 B2 | 9/2014 | Sukumar |
| 8,824,261 B1 | 9/2014 | Miller et al. |
| 8,832,528 B2 | 9/2014 | Thatcher et al. |
| 8,838,892 B2 | 9/2014 | Li |
| 8,843,700 B1 | 9/2014 | Salessi et al. |
| 8,850,108 B1 | 9/2014 | Hayes et al. |
| 8,850,288 B1 | 9/2014 | Lazier et al. |
| 8,856,593 B2 | 10/2014 | Eckhardt et al. |
| 8,856,619 B1 | 10/2014 | Cypher |
| 8,862,617 B2 | 10/2014 | Kesselman |
| 8,862,847 B2 | 10/2014 | Feng et al. |
| 8,862,928 B2 | 10/2014 | Xavier et al. |
| 8,868,825 B1 | 10/2014 | Hayes |
| 8,874,836 B1 | 10/2014 | Hayes |
| 8,880,793 B2 | 11/2014 | Nagineni |
| 8,880,825 B2 | 11/2014 | Lionetti et al. |
| 8,886,778 B2 | 11/2014 | Nedved et al. |
| 8,898,383 B2 | 11/2014 | Yamamoto et al. |
| 8,898,388 B1 | 11/2014 | Kimmel |
| 8,904,231 B2 | 12/2014 | Coatney et al. |
| 8,918,478 B2 | 12/2014 | Ozzie et al. |
| 8,930,307 B2 | 1/2015 | Colgrove et al. |
| 8,930,633 B2 | 1/2015 | Amit et al. |
| 8,943,357 B2 | 1/2015 | Atzmony |
| 8,949,502 B2 | 2/2015 | McKnight et al. |
| 8,959,110 B2 | 2/2015 | Smith et al. |
| 8,959,388 B1 | 2/2015 | Kuang et al. |
| 8,972,478 B1 | 3/2015 | Storer et al. |
| 8,972,779 B2 | 3/2015 | Lee et al. |
| 8,977,597 B2 | 3/2015 | Ganesh et al. |
| 8,996,828 B2 | 3/2015 | Kalos et al. |
| 9,003,144 B1 | 4/2015 | Hayes et al. |
| 9,009,724 B2 | 4/2015 | Gold et al. |
| 9,021,053 B2 | 4/2015 | Bernbo et al. |
| 9,021,215 B2 | 4/2015 | Meir et al. |
| 9,025,393 B2 | 5/2015 | Wu |
| 9,043,372 B2 | 5/2015 | Makkar et al. |
| 9,047,214 B1 | 6/2015 | Sharon et al. |
| 9,053,808 B2 | 6/2015 | Sprouse |
| 9,058,155 B2 | 6/2015 | Cepulis et al. |
| 9,063,895 B1 | 6/2015 | Madnani et al. |
| 9,063,896 B1 | 6/2015 | Madnani et al. |
| 9,098,211 B1 | 8/2015 | Madnani et al. |
| 9,110,898 B1 | 8/2015 | Chamness et al. |
| 9,110,964 B1 | 8/2015 | Shilane et al. |
| 9,116,819 B2 | 8/2015 | Cope et al. |
| 9,117,536 B2 | 8/2015 | Yoon |
| 9,122,401 B2 | 9/2015 | Zaltsman et al. |
| 9,123,422 B2 | 9/2015 | Sharon et al. |
| 9,124,300 B2 | 9/2015 | Olbrich et al. |
| 9,134,908 B2 | 9/2015 | Horn et al. |
| 9,153,337 B2 | 10/2015 | Sutardja |
| 9,158,472 B2 | 10/2015 | Kesselman et al. |
| 9,159,422 B1 | 10/2015 | Lee et al. |
| 9,164,891 B2 | 10/2015 | Karamcheti et al. |
| 9,183,136 B2 | 11/2015 | Kawamura et al. |
| 9,189,650 B2 | 11/2015 | Jaye et al. |
| 9,201,733 B2 | 12/2015 | Verma |
| 9,207,876 B2 | 12/2015 | Shu et al. |
| 9,229,656 B1 | 1/2016 | Contreras et al. |
| 9,229,810 B2 | 1/2016 | He et al. |
| 9,235,475 B1 | 1/2016 | Shilane et al. |
| 9,244,626 B2 | 1/2016 | Shah et al. |
| 9,250,687 B1 | 2/2016 | Aswadhati |
| 9,250,999 B1 | 2/2016 | Barroso |
| 9,251,066 B2 | 2/2016 | Colgrove et al. |
| 9,268,648 B1 | 2/2016 | Barash et al. |
| 9,268,806 B1 | 2/2016 | Kesselman et al. |
| 9,275,063 B1 | 3/2016 | Natanzon |
| 9,280,678 B2 | 3/2016 | Redberg |
| 9,286,002 B1 | 3/2016 | Karamcheti et al. |
| 9,292,214 B2 | 3/2016 | Kalos et al. |
| 9,298,760 B1 | 3/2016 | Li et al. |
| 9,304,908 B1 | 4/2016 | Karamcheti et al. |
| 9,311,969 B2 | 4/2016 | Murin |
| 9,311,970 B2 | 4/2016 | Sharon et al. |
| 9,323,663 B2 | 4/2016 | Karamcheti et al. |
| 9,323,667 B2 | 4/2016 | Bennett |
| 9,323,681 B2 | 4/2016 | Apostolides et al. |
| 9,335,942 B2 | 5/2016 | Kumar et al. |
| 9,348,538 B2 | 5/2016 | Mallaiah et al. |
| 9,355,022 B2 | 5/2016 | Ravimohan et al. |
| 9,384,082 B1 | 7/2016 | Lee et al. |
| 9,384,252 B2 | 7/2016 | Akirav et al. |
| 9,389,958 B2 | 7/2016 | Sundaram et al. |
| 9,390,019 B2 | 7/2016 | Patterson et al. |
| 9,395,922 B2 | 7/2016 | Nishikido |
| 9,396,202 B1 | 7/2016 | Drobychev et al. |
| 9,400,828 B2 | 7/2016 | Kesselman et al. |
| 9,405,478 B2 | 8/2016 | Koseki et al. |
| 9,411,685 B2 | 8/2016 | Lee |
| 9,417,960 B2 | 8/2016 | Klein |
| 9,417,963 B2 | 8/2016 | He et al. |
| 9,430,250 B2 | 8/2016 | Hamid et al. |
| 9,430,542 B2 | 8/2016 | Akirav et al. |
| 9,432,541 B2 | 8/2016 | Ishida |
| 9,454,434 B2 | 9/2016 | Sundaram et al. |
| 9,471,579 B1 | 10/2016 | Natanzon |
| 9,477,554 B2 | 10/2016 | Chamness et al. |
| 9,477,632 B2 | 10/2016 | Du |
| 9,501,398 B2 | 11/2016 | George et al. |
| 9,525,737 B2 | 12/2016 | Friedman |
| 9,529,542 B2 | 12/2016 | Friedman et al. |
| 9,535,631 B2 | 1/2017 | Fu et al. |
| 9,552,248 B2 | 1/2017 | Miller et al. |
| 9,552,291 B2 | 1/2017 | Munetoh et al. |
| 9,552,299 B2 | 1/2017 | Stalzer |
| 9,563,517 B1 | 2/2017 | Natanzon et al. |
| 9,588,698 B1 | 3/2017 | Karamcheti et al. |
| 9,588,712 B2 | 3/2017 | Kalos et al. |
| 9,594,652 B2 | 3/2017 | Sathiamoorthy et al. |
| 9,600,193 B2 | 3/2017 | Ahrens et al. |
| 9,619,321 B1 | 4/2017 | Sharon et al. |
| 9,619,430 B2 | 4/2017 | Kannan et al. |
| 9,645,754 B2 | 5/2017 | Li et al. |
| 9,667,720 B1 | 5/2017 | Bent et al. |
| 9,710,535 B2 | 7/2017 | Aizman et al. |
| 9,733,840 B2 | 8/2017 | Karamcheti et al. |
| 9,734,225 B2 | 8/2017 | Akirav et al. |
| 9,740,403 B2 | 8/2017 | Storer et al. |
| 9,740,700 B1 | 8/2017 | Chopra et al. |
| 9,740,762 B2 | 8/2017 | Horowitz et al. |
| 9,747,319 B2 | 8/2017 | Bestler et al. |
| 9,747,320 B2 | 8/2017 | Kesselman |
| 9,767,130 B2 | 9/2017 | Bestler et al. |
| 9,781,227 B2 | 10/2017 | Friedman et al. |
| 9,785,498 B2 | 10/2017 | Misra et al. |
| 9,798,486 B1 | 10/2017 | Singh |
| 9,804,925 B1 | 10/2017 | Carmi et al. |
| 9,811,285 B1 | 11/2017 | Karamcheti et al. |
| 9,811,546 B1 | 11/2017 | Bent et al. |
| 9,818,478 B2 | 11/2017 | Chung et al. |

(56) References Cited

U.S. PATENT DOCUMENTS

| | | |
|---|---|---|
| 9,829,066 B2 | 11/2017 | Thomas et al. |
| 9,836,245 B2 | 12/2017 | Hayes et al. |
| 9,864,874 B1 | 1/2018 | Shanbhag |
| 9,891,854 B2 | 2/2018 | Munetoh et al. |
| 9,891,860 B1 | 2/2018 | Delgado et al. |
| 9,892,005 B2 | 2/2018 | Kedem et al. |
| 9,892,186 B2 | 2/2018 | Akirav et al. |
| 9,904,589 B1 | 2/2018 | Donlan et al. |
| 9,904,717 B2 | 2/2018 | Anglin et al. |
| 9,952,809 B2 | 2/2018 | Shah |
| 9,910,748 B2 | 3/2018 | Pan |
| 9,910,904 B2 | 3/2018 | Anglin et al. |
| 9,934,237 B1 | 4/2018 | Shilane et al. |
| 9,940,065 B2 | 4/2018 | Kalos et al. |
| 9,946,604 B1 | 4/2018 | Glass |
| 9,959,167 B1 | 5/2018 | Donlan et al. |
| 9,965,539 B2 | 5/2018 | D'halluin et al. |
| 9,998,539 B1 | 6/2018 | Brock et al. |
| 10,007,457 B2 | 6/2018 | Hayes et al. |
| 10,013,177 B2 | 7/2018 | Liu et al. |
| 10,013,311 B2 | 7/2018 | Sundaram et al. |
| 10,019,314 B2 | 7/2018 | Litsyn et al. |
| 10,019,317 B2 | 7/2018 | Usvyatsky et al. |
| 10,025,673 B1 | 7/2018 | Maccanti |
| 10,031,703 B1 | 7/2018 | Natanzon et al. |
| 10,061,512 B2 | 8/2018 | Chu et al. |
| 10,073,626 B2 | 9/2018 | Karamcheti et al. |
| 10,082,985 B2 | 9/2018 | Hayes et al. |
| 10,089,012 B1 | 10/2018 | Chen et al. |
| 10,089,174 B2 | 10/2018 | Lin |
| 10,089,176 B1 | 10/2018 | Donlan et al. |
| 10,102,356 B1 | 10/2018 | Sahin |
| 10,108,819 B1 | 10/2018 | Donlan et al. |
| 10,146,787 B2 | 12/2018 | Bashyam et al. |
| 10,152,268 B1 | 12/2018 | Chakraborty et al. |
| 10,157,098 B2 | 12/2018 | Chung et al. |
| 10,162,704 B1 | 12/2018 | Kirschner et al. |
| 10,180,875 B2 | 1/2019 | Northcott |
| 10,185,495 B2 | 1/2019 | Katsuki |
| 10,185,730 B2 | 1/2019 | Bestler et al. |
| 10,235,065 B1 | 3/2019 | Miller et al. |
| 10,324,639 B2 | 6/2019 | Seo |
| 10,567,406 B2 | 2/2020 | Astigarraga |
| 10,810,088 B1 | 10/2020 | Gu |
| 10,846,137 B2 | 11/2020 | Vallala |
| 10,877,683 B2 | 12/2020 | Wu |
| 11,106,810 B2 | 8/2021 | Natanzon |
| 2002/0144059 A1 | 10/2002 | Kendall |
| 2003/0105984 A1 | 6/2003 | Masuyama et al. |
| 2003/0110205 A1 | 6/2003 | Johnson |
| 2004/0161086 A1 | 8/2004 | Buntin et al. |
| 2005/0001652 A1 | 1/2005 | Malik et al. |
| 2005/0076228 A1 | 4/2005 | Davis et al. |
| 2005/0235132 A1 | 10/2005 | Karr et al. |
| 2005/0278460 A1 | 12/2005 | Shin et al. |
| 2005/0283649 A1 | 12/2005 | Turner et al. |
| 2006/0015683 A1 | 1/2006 | Ashmore et al. |
| 2006/0114930 A1 | 6/2006 | Lucas et al. |
| 2006/0174157 A1 | 8/2006 | Barrall et al. |
| 2006/0248294 A1 | 11/2006 | Nedved et al. |
| 2007/0079068 A1 | 4/2007 | Draggon |
| 2007/0214194 A1 | 9/2007 | Reuter |
| 2007/0214314 A1 | 9/2007 | Reuter |
| 2007/0234016 A1 | 10/2007 | Davis et al. |
| 2007/0268905 A1 | 11/2007 | Baker et al. |
| 2008/0080709 A1 | 4/2008 | Michtchenko et al. |
| 2008/0107274 A1 | 5/2008 | Worthy |
| 2008/0155191 A1 | 6/2008 | Anderson et al. |
| 2008/0295118 A1 | 11/2008 | Liao |
| 2009/0077208 A1 | 3/2009 | Nguyen et al. |
| 2009/0138654 A1 | 5/2009 | Sutardja |
| 2009/0216910 A1 | 8/2009 | Duchesneau |
| 2009/0216920 A1 | 8/2009 | Lauterbach et al. |
| 2010/0017444 A1 | 1/2010 | Chatterjee et al. |
| 2010/0042636 A1 | 2/2010 | Lu |
| 2010/0094806 A1 | 4/2010 | Apostolides et al. |
| 2010/0115070 A1 | 5/2010 | Missimilly |
| 2010/0125695 A1 | 5/2010 | Wu et al. |
| 2010/0162076 A1 | 6/2010 | Sim-Tang et al. |
| 2010/0169707 A1 | 7/2010 | Mathew et al. |
| 2010/0174576 A1 | 7/2010 | Naylor |
| 2010/0268908 A1 | 10/2010 | Ouyang et al. |
| 2011/0035540 A1 | 2/2011 | Fitzgerald |
| 2011/0040925 A1 | 2/2011 | Frost et al. |
| 2011/0060927 A1 | 3/2011 | Fillingim et al. |
| 2011/0119462 A1 | 5/2011 | Leach et al. |
| 2011/0219170 A1 | 9/2011 | Frost et al. |
| 2011/0238625 A1 | 9/2011 | Hamaguchi et al. |
| 2011/0264843 A1 | 10/2011 | Haines et al. |
| 2011/0302369 A1 | 12/2011 | Goto et al. |
| 2012/0011398 A1 | 1/2012 | Eckhardt |
| 2012/0079318 A1 | 3/2012 | Colgrove et al. |
| 2012/0089567 A1 | 4/2012 | Takahashi et al. |
| 2012/0110249 A1 | 5/2012 | Jeong et al. |
| 2012/0131253 A1 | 5/2012 | McKnight |
| 2012/0158923 A1 | 6/2012 | Mohamed et al. |
| 2012/0191900 A1 | 7/2012 | Kunimatsu et al. |
| 2012/0198152 A1 | 8/2012 | Terry et al. |
| 2012/0198261 A1 | 8/2012 | Brown et al. |
| 2012/0209943 A1 | 8/2012 | Jung |
| 2012/0226934 A1 | 9/2012 | Rao |
| 2012/0246435 A1 | 9/2012 | Meir et al. |
| 2012/0260055 A1 | 10/2012 | Murase |
| 2012/0311557 A1 | 12/2012 | Resch |
| 2013/0022201 A1 | 1/2013 | Glew et al. |
| 2013/0036314 A1 | 2/2013 | Glew et al. |
| 2013/0042056 A1 | 2/2013 | Shats |
| 2013/0060884 A1 | 3/2013 | Bernbo et al. |
| 2013/0067188 A1 | 3/2013 | Mehra et al. |
| 2013/0073894 A1 | 3/2013 | Xavier et al. |
| 2013/0124776 A1 | 5/2013 | Hallak et al. |
| 2013/0132800 A1 | 5/2013 | Healy et al. |
| 2013/0151653 A1 | 6/2013 | Sawiki |
| 2013/0151771 A1 | 6/2013 | Tsukahara et al. |
| 2013/0173853 A1 | 7/2013 | Ungureanu et al. |
| 2013/0238554 A1 | 9/2013 | Yucel et al. |
| 2013/0339314 A1 | 12/2013 | Carpenter et al. |
| 2013/0339635 A1 | 12/2013 | Amit et al. |
| 2013/0339818 A1 | 12/2013 | Baker et al. |
| 2014/0040535 A1 | 2/2014 | Lee |
| 2014/0040702 A1 | 2/2014 | He et al. |
| 2014/0047263 A1 | 2/2014 | Coatney et al. |
| 2014/0047269 A1 | 2/2014 | Kim |
| 2014/0063721 A1 | 3/2014 | Herman et al. |
| 2014/0064048 A1 | 3/2014 | Cohen et al. |
| 2014/0068224 A1 | 3/2014 | Fan et al. |
| 2014/0075252 A1 | 3/2014 | Luo et al. |
| 2014/0122510 A1 | 5/2014 | Namkoong et al. |
| 2014/0136880 A1 | 5/2014 | Shankar et al. |
| 2014/0181402 A1 | 6/2014 | White |
| 2014/0237164 A1 | 8/2014 | Le et al. |
| 2014/0279936 A1 | 9/2014 | Bernbo et al. |
| 2014/0280025 A1 | 9/2014 | Eidson et al. |
| 2014/0289588 A1 | 9/2014 | Nagadomi et al. |
| 2014/0330785 A1 | 11/2014 | Isherwood et al. |
| 2014/0372838 A1 | 12/2014 | Lou et al. |
| 2014/0380125 A1 | 12/2014 | Calder et al. |
| 2014/0380126 A1 | 12/2014 | Yekhanin et al. |
| 2015/0032720 A1 | 1/2015 | James |
| 2015/0039645 A1 | 2/2015 | Lewis |
| 2015/0039849 A1 | 2/2015 | Lewis |
| 2015/0089283 A1 | 3/2015 | Kermarrec et al. |
| 2015/0100746 A1 | 4/2015 | Rychlik |
| 2015/0134824 A1 | 5/2015 | Mickens |
| 2015/0153800 A1 | 6/2015 | Lucas et al. |
| 2015/0180714 A1 | 6/2015 | Chunn |
| 2015/0280959 A1 | 10/2015 | Vincent |
| 2016/0246537 A1 | 2/2016 | Kim |
| 2016/0191508 A1 | 6/2016 | Bestler et al. |
| 2016/0378612 A1 | 12/2016 | Hipsh et al. |
| 2017/0091236 A1 | 3/2017 | Hayes et al. |
| 2017/0103092 A1 | 4/2017 | Hu et al. |
| 2017/0103094 A1 | 4/2017 | Hu et al. |
| 2017/0103098 A1 | 4/2017 | Hu et al. |

(56) References Cited

U.S. PATENT DOCUMENTS

| | | | |
|---|---|---|---|
| 2017/0103116 | A1 | 4/2017 | Hu et al. |
| 2017/0177236 | A1 | 6/2017 | Haratsch et al. |
| 2018/0039442 | A1 | 2/2018 | Shadrin et al. |
| 2018/0081958 | A1 | 3/2018 | Akirav et al. |
| 2018/0101441 | A1 | 4/2018 | Hyun et al. |
| 2018/0101587 | A1 | 4/2018 | Anglin et al. |
| 2018/0101588 | A1 | 4/2018 | Anglin et al. |
| 2018/0217756 | A1 | 8/2018 | Liu et al. |
| 2018/0307560 | A1 | 10/2018 | Vishnumolakala et al. |
| 2018/0321874 | A1 | 11/2018 | Li et al. |
| 2019/0036703 | A1 | 1/2019 | Bestler |

FOREIGN PATENT DOCUMENTS

| | | |
|---|---|---|
| JP | 2010128886 A | 6/2010 |
| JP | 2013539133 A | 10/2013 |
| JP | 2013544386 A | 12/2013 |
| WO | WO 02-13033 | 2/2002 |
| WO | WO 2008103569 | 8/2008 |
| WO | WO 2008157081 | 12/2008 |
| WO | WO 2013032825 | 7/2013 |
| WO | WO2014025821 A2 | 2/2014 |

OTHER PUBLICATIONS

Schmid, Patrick: "RAID Scaling Charts, Part 3:4-128 kB Stripes Compared", Tom's Hardware, Nov. 27, 2007 (http://www.tomshardware.com/reviews/RAID-SCALING-CHARTS.1735-4.html), See pp. 1-2.

Storer, Mark W. et al., "Pergamum: Replacing Tape with Energy Efficient, Reliable, Disk-Based Archival Storage," Fast '08: 6th USENIX Conference on File and Storage Technologies, San Jose, CA, Feb. 26-29, 2008 pp. 1-16.

Ju-Kyeong Kim et al., "Data Access Frequency based Data Replication Method using Erasure Codes in Cloud Storage System", Journal of the Institute of Electronics and Information Engineers, Feb. 2014, vol. 51, No. 2, pp. 85-91.

International Search Report and the Written Opinion of the International Searching Authority, PCT/US2015/018169, dated May 15, 2015.

International Search Report and the Written Opinion of the International Searching Authority, PCT/US2015/034302, dated Sep. 11, 2015.

International Search Report and the Written Opinion of the International Searching Authority, PCT/US2015/039135, dated Sep. 18, 2015.

International Search Report and the Written Opinion of the International Searching Authority, PCT/US2015/039136, dated Sep. 23, 2015.

International Search Report, PCT/US2015/039142, dated Sep. 24, 2015.

International Search Report, PCT/US2015/034291, dated Sep. 30, 2015.

International Search Report and the Written Opinion of the International Searching Authority, PCT/US2015/039137, dated Oct. 1, 2015.

International Search Report, PCT/US2015/044370, dated Dec. 15, 2015.

International Search Report amd the Written Opinion of the International Searching Authority, PCT/US2016/031039, dated May 5, 2016.

International Search Report, PCT/US2016/014604, dated May 19, 2016.

International Search Report, PCT/US2016/014361, dated May 30, 2016.

International Search Report, PCT/US2016/014356, dated Jun. 28, 2016.

International Search Report, PCT/US2016/014357, dated Jun. 29, 2016.

International Seach Report and the Written Opinion of the International Searching Authority, PCT/US2016/016504, dated Jul. 6, 2016.

International Seach Report and the Written Opinion of the International Searching Authority, PCT/US2016/024391, dated Jul. 12, 2016.

International Seach Report and the Written Opinion of the International Searching Authority, PCT/US2016/026529, dated Jul. 19, 2016.

International Seach Report and the Written Opinion of the International Searching Authority, PCT/US2016/023485, dated Jul. 21, 2016.

International Seach Report and the Written Opinion of the International Searching Authority, PCT/US2016/033306, dated Aug. 19, 2016.

International Seach Report and the Written Opinion of the International Searching Authority, PCT/US2016/047808, dated Nov. 25, 2016.

Stalzer, Mark A., "FlashBlades: System Architecture and Applications," Proceedings of the 2nd Workshop on Architectures and Systems for Big Data, Association for Computing Machinery, New York, NY, 2012, pp. 10-14.

International Seach Report and the Written Opinion of the International Searching Authority, PCT/US2016/042147, dated Nov. 30, 2016.

* cited by examiner

REASSIGNMENT OF REQUESTS FOR HIGH AVAILABILITY

BACKGROUND

The term storage management encompasses the technologies and processes organizations use to maximize or improve the performance of their data storage resources. It is a broad category that includes but is not limited to virtualization, replication, mirroring, security, compression, traffic analysis, process automation, storage provisioning, and related techniques. The management of multi-array data storage architectures presents a variety of challenges.

Conventional approaches to the management of multi-array data storage systems involve the use of scale-up and scale-out architectures. The management challenges presented by scale-up architectures center around the complexities of multi-array management, and include but are not limited to, the migration of data across storage arrays of a multi-array architecture. The management challenges presented by scale-out architectures include fixed compute/storage ratios, problematic many-to-many cabling schemes and availability of low-end solutions. It is within this context that the embodiments arise.

SUMMARY

The management of multi-array data storage architectures presents a variety of challenges. A method of operating a storage system is disclosed that addresses the aforementioned shortcomings of conventional technologies. However, the claimed embodiments are not limited to implementations that address any or all of the aforementioned shortcomings. The method includes determining a data storage cluster among data storage arrays of the storage system. Each data storage array includes at least two data storage controllers and at least one data storage shelf. The at least two data storage controllers are configured to function as both a primary data storage controller for a first data storage array and a secondary data storage controller for a second data storage array. This method enables single array management, dynamic compute/store ratios, an absence of many-to-many cabling, straight forward data migration and available low-end solutions.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Figure 1A:
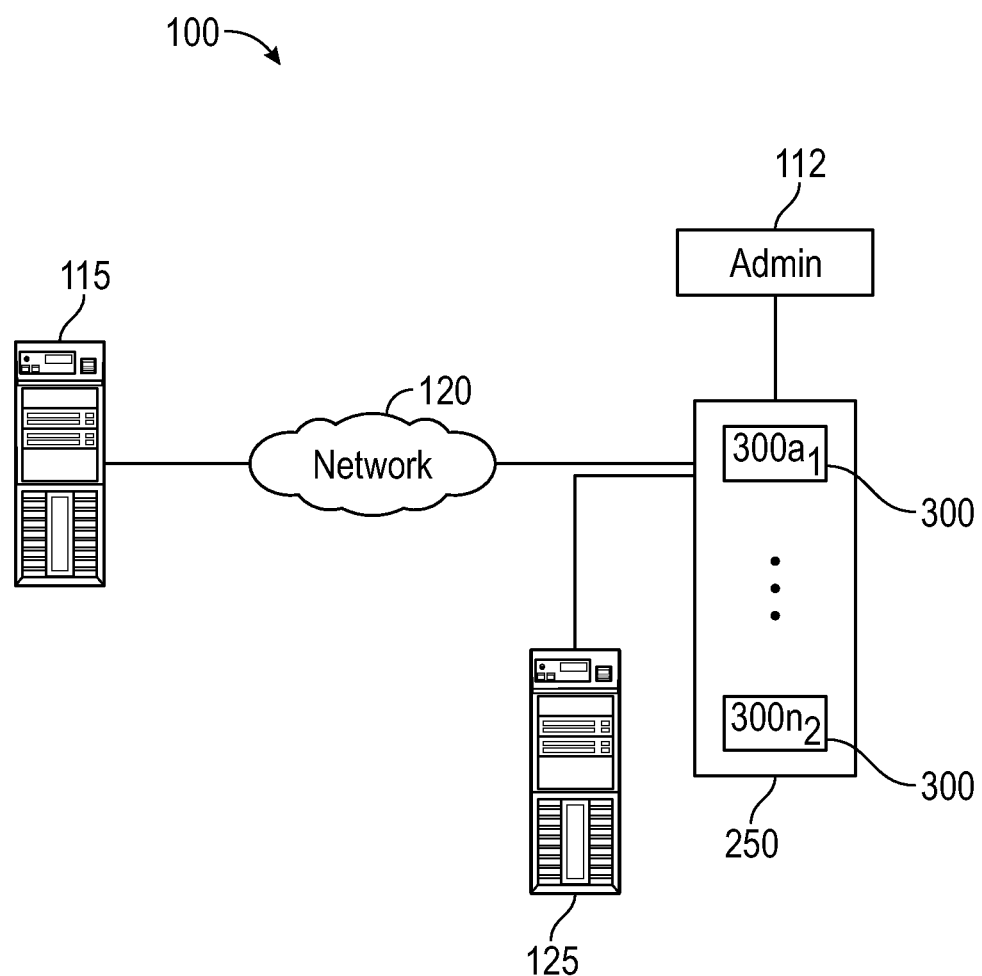
FIG. 1A shows an exemplary operating environment of a system for operating a storage system according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "forwarding" or "determining" or "configuring" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

FIG. 1A shows an exemplary operating environment 100 of systems 300 for operating a data storage system. Systems 300 include systems $300a_1$-$300n_2$ that are each associated with individual storage controllers of a plurality of storage controllers of a group of storage arrays. Systems 300 determine a storage cluster 250 (that includes at least two storage arrays) among the group of storage arrays and configure storage controllers of storage cluster 250 to function, in some embodiments, as both a primary controller for a first storage array and a secondary controller (e.g., a redundant controller) for a second storage array. In doing such, system 300 determines a logical domain that includes at least two storage arrays wherein each storage array of storage cluster 250 has a primary and a secondary controller (e.g., a redundant controller) and one or more storage shelves. In one embodiment, each storage shelf houses one or more storage devices (e.g., SSDs). As discussed in more detail below, the secondary controller may be shared among various storage arrays (see FIGS. 2C-2F and accompanying description below for detailed illustrations and descriptions of the aforementioned storage arrays and storage array parts). Systems 300 logically associate the storage arrays by determining an unbounded number of storage arrays such that shelf sets of the storage arrays are shared among multiple controllers. In this manner, storage controllers have direct access to storage array shelves that are associated with the corresponding storage controllers. In some embodiments, the storage cluster architecture features a logical sequence of storage controllers and shelves, as illustrated in FIGS. 2C-2F, where the shelves that are positioned between two controllers in the logical sequence are accessible from both controllers. This architectural approach provides single array management, a dynamic compute/store ratio, the absence of many-to-many cabling, straightforward data migration and available low-end solutions.

FIG. 1A shows storage cluster 250, systems 300, storage admin 112, client server 115, network 120 and client server 125. In the FIG. 1A embodiment, each of client servers 115 (remote) and 125 (local) may access storage cluster 250. In some embodiments, there may be different numbers and types of local or remote servers. For example, client servers 115 and 125 are representative of any number and type of network devices. Storage cluster 250 may be coupled to remote client server 115 via network 120 and to local client server 125 through another network (e.g., local). In one embodiment, network 120 may be any type of network, including wireless, direct local area network (LAN), wide area network (WAN) such as the Internet, storage area network, Ethernet, and others.

Figure 1B:
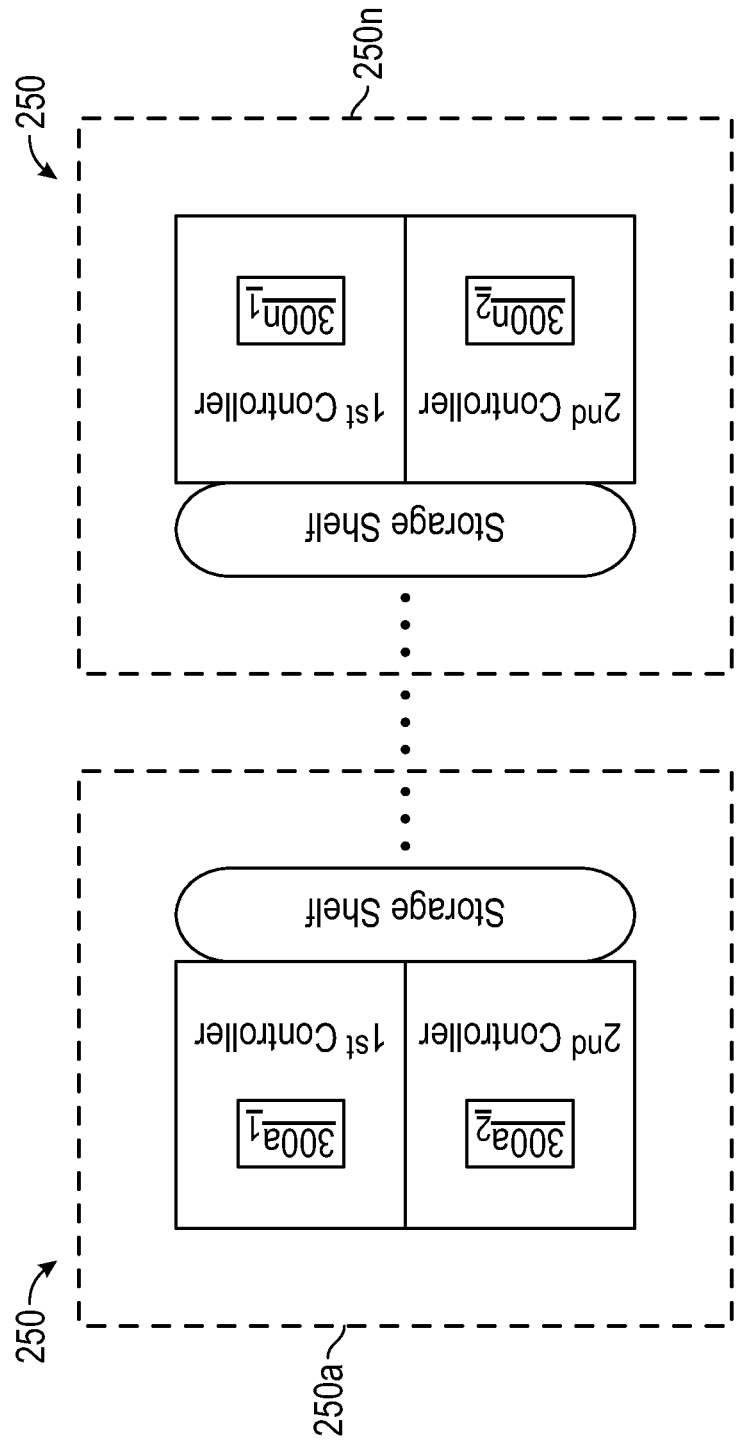
FIG. 1B shows a storage cluster that includes storage arrays that each include first and second storage controllers and at least one storage shelf according to one embodiment.

Referring to FIG. 1B, storage cluster 250 can include a plurality of storage arrays (two or more) of storage arrays 250a-250n, that each include first and second storage controllers, and at least one storage shelf. In one embodiment, as discussed above, each storage shelf can include one or more storage devices (e.g., SSDs). In one embodiment, the storage capacity of each storage array 250a-250n is expandable from the at least one initial storage shelf to include one or more additional storage shelves (see ellipses). In one embodiment, the storage controllers may include hardware (e.g., circuitry, dedicated logic, programmable logic), software (e.g., executable program instructions), or a combination thereof. The storage controllers can include storage components within which systems $300a_1$-$300n_2$ reside. For example, in one embodiment, systems $300a_1$-$300n_2$ can be a part of an operating system of the storage controller with which they are associated or can be separate from the operating system of the storage controller with which they are associated but can work cooperatively therewith (for example as a part of separate software or firmware with components that operate on the storage controller and/or on devices or components of storage devices within shelves).

As discussed above, systems $300a_1$-$300n_2$ determine a storage cluster among storage arrays 250a-250n and configure the storage controllers of the storage cluster to function as both a primary controller for a first storage array and a secondary controller for a second storage array (see FIGS. 2C-2F and accompanying descriptions below for details). In one embodiment, storage shelves can be located inside the same physical box with the storage controllers. In other embodiments, storage shelves can be located outside of the physical storage controller box. The secondary controller can be shared by multiple primary controllers. The secondary controller can also be shared by more than one storage array. In one embodiment systems 300 access (e.g., receives, retrieves) global metadata and directs the forwarding of I/O (input/output) requests based on the accessed global metadata. In situations where systems 300 determine that an I/O request that is received by a first storage controller in the storage cluster is actually associated with a second storage controller of a different storage array of the storage cluster, the I/O request is forwarded to the second storage controller. In one embodiment, systems 300 can determine that an I/O request is associated with a storage controller by determining if requested information is stored in a storage array associated with the storage controller as discussed in more detail below. It should be appreciated that alternative mechanisms for determining that an I/O request is associated with a storage controller are readily devised as the examples provided herein are not meant to be limiting.

Still referring to FIG. 1B, systems $300a_1$-$300n_2$ monitor forwarded I/O requests. In some embodiments, systems $300a_1$-$300n_2$ can track the number of relay events (e.g., the number of times that a request is relayed or hops between controllers) associated with a forwarded I/O request. Responsive to the monitoring, systems $300a_1$-$300n_2$ can act to reduce the number of relay events for one or more I/O requests by reassigning one or more controllers of the storage controllers. In one embodiment, a reassignment of a storage controller can include but is not limited to a reassignment of a first storage controller to handle a request that is currently handled by a second storage controller. Actions taken to reduce the number of relay events for one or more I/O requests can include modifying the storage cluster, such as migrating one or more volumes from one storage array to another, adding or removing capacity to a storage array (or adding storage controllers) and cabling hosts differently.

Systems $300a_1$-$300n_2$ utilize metadata (see global metadata 280 shown in FIG. 2C and accompanying description below), I/O forwarding and relay efficiency tracking in order to appear as a single array. Global metadata refers to metadata that is replicated across all storage arrays of a determined storage cluster in some embodiments. Global metadata may include the list of volumes and snapshots that are stored on storage arrays of the storage cluster and a global list of hosts and ports. It should be appreciated that this information enables systems $300a_1$-$300n_2$ to determine how to direct the forwarding of I/O requests by accessing and/or updating the global metadata. In one embodiment, storage controllers can communicate changes in global metadata through a gossip protocol to maintain coherency of the metadata. In other embodiments, storage controllers can communicate changes in global metadata in any other manner of suitably communicating changes in a distributed system, e.g., through a master/slave protocol or a token based protocol. In the embodiments, a storage array or controller that is associated with a volume subset can service an I/O request that is issued for other volumes by relaying the I/O request to the appropriate storage controller or array. Statistics that may be tracked include the number of relayed requests for each host/port/volume.

In one embodiment, systems $300a_1$-$300n_2$ can suggest actions for improving relay efficiency. Actions suggested can include but are not limited to: (1) migrating a volume from one storage array to another, if the volume is commonly accessed through the port of another storage array (in some embodiments this may be done automatically by the system), (2) adding or removing storage capacity to a storage array, (3) adding controllers, and (4) changing the cabling for relay minimization purposes. In one embodiment, an alert can be provided that prompts the suggested actions. Changes, such as migration of volumes, are recorded in the global metadata.

Figure 2A:
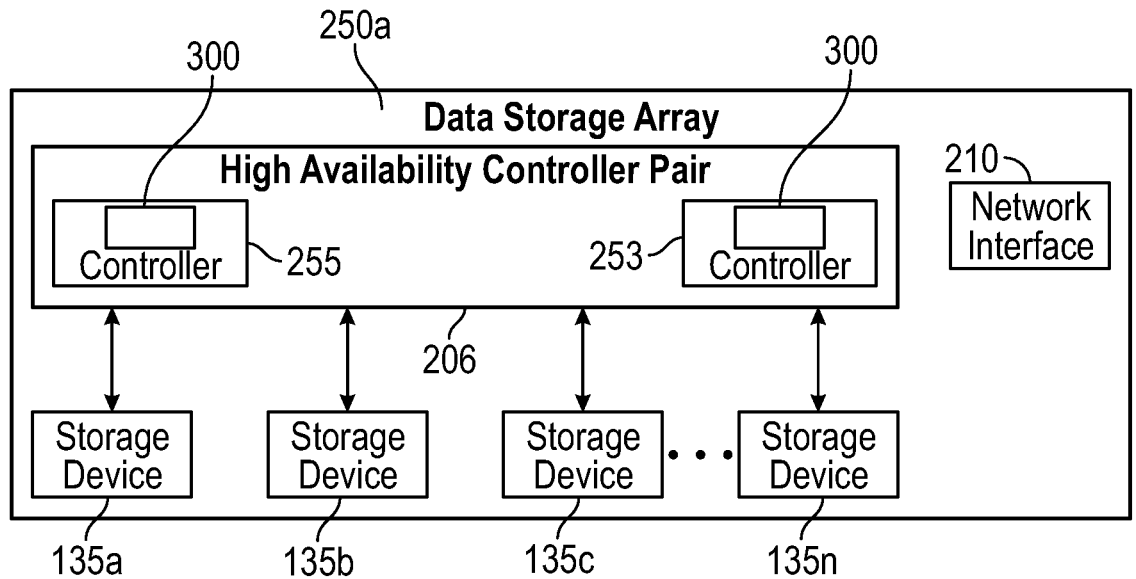
FIG. 2A shows a data storage array with a high availability controller pair according to one embodiment.

FIG. 2A is a system diagram of data storage array 250*a* of FIG. 1B, which has a high-availability controller pair 206 that includes storage controllers 253 and 255. As shown in FIG. 2A, and discussed with reference to FIG. 1B, an instance of systems 300 can reside on each storage controller 253 and 255 of high-availability controller pair 206 and can operate as a part of the operating system installed thereon or in conjunction therewith (for purposes of clarity and brevity, in the remainder of the detailed description, each instance of systems 300 is referenced with number "300" in drawings, e.g., FIGS. 2A-2F and 3B, and in accompanying description). Multiple storage devices 135*a*-*n* are coupled to the high-availability controller pair 206. Storage devices 135*a*-*n* could include solid-state drives (SSD), hard disk drives (HDD), optical drives or other types of storage memory. A network interface 210 couples the data storage array 250*a* to a network, which could be wired or wireless. In exemplary embodiments, controllers 253 and 255 each have their own independent network interfaces (not shown in FIG. 2A). Either of the controllers 253, 255 can communicate with any of the storage devices 135*a*-*n* (when communicative), for example via one or more busses or network connections. In one embodiment, a plurality of data storage arrays, configured as data storage array 250*a* shown in FIG. 2A, can be logically associated and used in exemplary environment 100 shown in FIG. 1A.

Figure 2B:
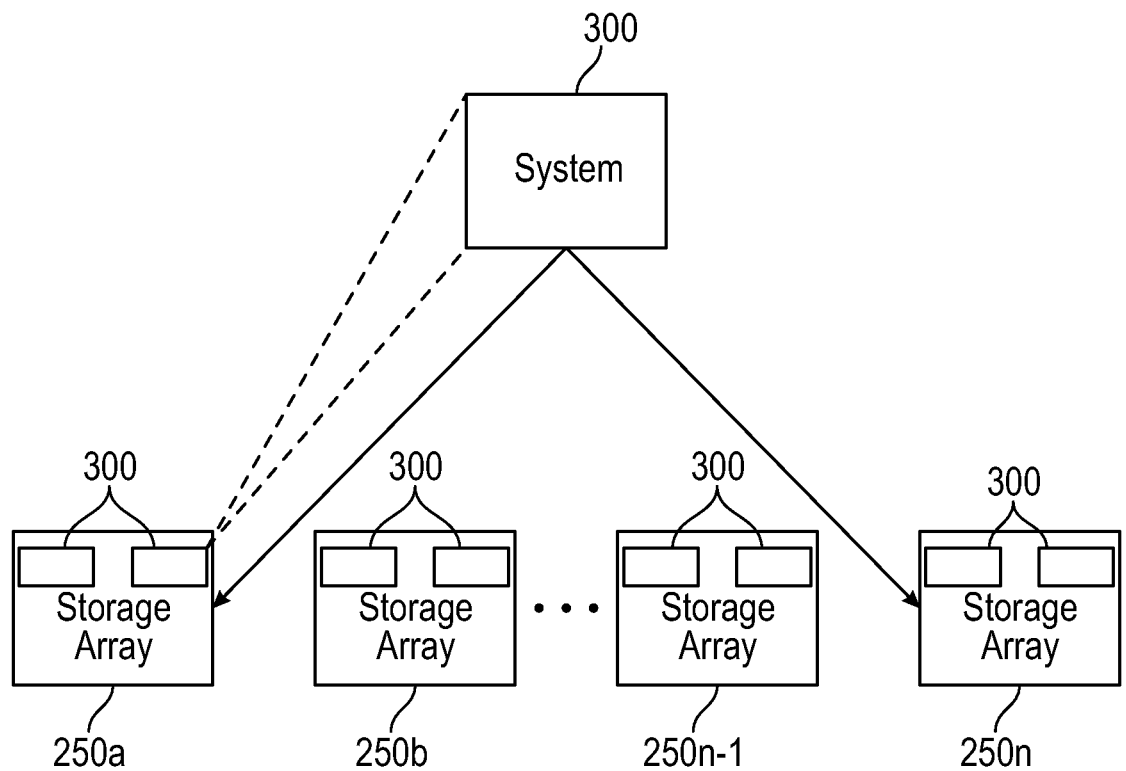
FIG. 2B illustrates the determining of a plurality of logically associated data storage arrays of a storage cluster according to one embodiment.

In particular, in one embodiment, as part of the operation of the systems 300 a plurality of logically associated data storage arrays of a storage cluster are determined. For example, as shown in FIG. 2B, from a group of individual data storage arrays 250*a*-250*n*, that are similar in structure and operation to data storage array 250*a* of FIG. 2A, a system 300 (in this example one of the systems 300 that are associated with data storage array 250*a*) determines a storage cluster consisting of data storage arrays, 250*a* and 250*n* (see arrows). It should be noted that the other systems 300 that are associated with the other storage arrays of storage arrays 250*a*-250*n*, can determine storage arrays of a storage cluster in a similar manner. In addition, it should be noted that a storage cluster can consist of any combination of data storage arrays that are a part of the group of data storage arrays 250*a*-250*n*.

Figure 2C:
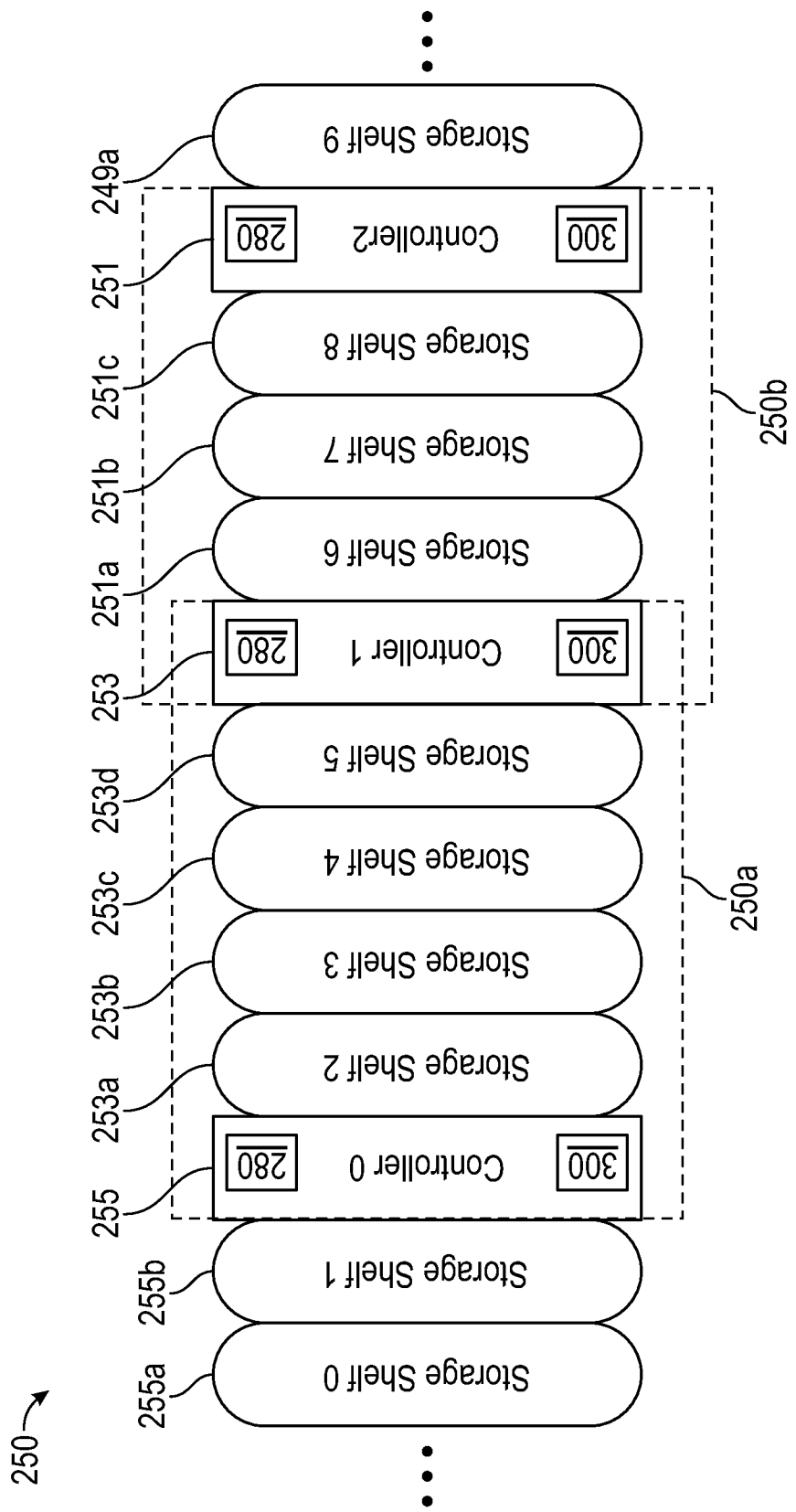
FIG. 2C shows a storage cluster that includes data storage arrays according to one embodiment.

FIG. 2C shows a storage cluster 250 that includes a logical association of storage arrays according to one embodiment. As such, FIG. 2C illustrates a logical arrangement of storage controllers and storage shelves of storage cluster 250 that is not necessarily representative of the actual physical layout of the storage controllers and storage shelves. In one embodiment, as described above, a storage array can include at least two storage controllers and at least one storage shelf. For example, storage array 250*a* of storage cluster 250 (see dashed line box) includes storage controller 253, storage shelves 253*a*-253*d* and storage controller 255. A second storage array 250*b* of storage cluster 250 includes storage controller 251, storage shelves 251*a*-251*c* and storage controller 253. Storage cluster 250 includes storage controllers 251, 253 and 255. Each storage controller 251, 253 and 255 is illustrated as having one or more storage shelves positioned to each side. For example, storage controller 251 has shelf 249*a* and shelves 251*a*-251*c*, respectively, positioned at a first and a second side, storage controller 253 has shelves 251*a*-251*c* and shelves 253*a*-253*d*, respectively, positioned at a first and a second side and storage controller 255 has shelves 253*a*-253*d* and shelves 255*a*-255*b*, respectively, positioned at a first and a second side. In this logical illustration, a shelf or shelves that is/are positioned between two storage controllers is/are accessible through the two storage controllers. It should be appreciated that FIG. 2C only depicts a portion of storage cluster 250 as additional storage arrays that at least include, respectively, storage controller 251 and storage shelf 249*a*, and, storage controller 255 and storage shelves 255*a* and 255*b* are only partially shown (see the ellipses depicted at the left and right of FIG. 2C). It should be further appreciated that system 300 and global metadata 280 can be replicated across cluster 250 and reside on each of the storage controllers 251, 253 and 255 as shown in FIG. 2C.

In one embodiment, storage controllers 251, 253 and 255 can be configured to function as both a primary controller for a first storage array and a secondary controller for a second storage array. For example, storage controller 251 can be configured to function as a primary storage controller for a storage array that includes shelves 251*a*-251*c* and as a secondary storage controller for a storage array that includes shelf 249*a*. Moreover, in one embodiment, when functioning as a secondary storage controller, storage controllers 251, 253 and 255 can be shared by multiple primary controllers. For example, when functioning as a secondary storage controller, storage controller 253 can be shared by primary controllers 251 and 255.

A scale-up array is an array that uses one or more controllers to service an expandable amount of storage media. In one embodiment, storage cluster 250 uses scale-up array components as building blocks. In other embodiments, storage cluster 250 can use other type storage array components as building blocks. As discussed herein, storage cluster 250 can include a plurality of storage arrays where the storage arrays are logically associated to form an ordered sequence of storage arrays. This topology enables storage cluster expansion either at the edges of storage cluster 250 or internally to storage cluster 250. Moreover, it enables cabling that is linear in relation to the number of storage arrays that is present in the storage cluster 250.

One advantage of the topology of the embodiment illustrated in FIG. 2C is that data may be stored in locations that are close to a host that is accessing the data. In addition, if a host's capacity requirements increase, the increase can be addressed in multiple ways. For example, an increase in a host's capacity requirements can be addressed through techniques that include but are not limited to: (1) inserting an extra shelf to the set controlled by the controller the host is connected to, (2) replacing a shelf by a shelf having greater memory capacity, and (3) inserting a shelf into a shelf-set that is not directly accessible by the controller attached to the host. When a shelf is inserted into a shelf-set that is not directly accessible by the controller attached to the host, and an I/O request from the host is directed to data on that shelf, the I/O request is relayed through controllers until it reaches a controller that controls the shelf set where the data is located.

In one embodiment, where scale-up building blocks are used, a variety of compute/storage ratios and fast controller failovers are enabled. Moreover, in such cases, being a composite of "scale-up" arrays, storage shelves are associated with storage arrays and hosts are connected to some subset of controllers. Storage cluster 250 appears as a single scale-out array to any connected host. That is, storage cluster 250 appears as a single scale-out array, to any host, regardless of the subset of storage controllers/storage arrays to which it is connected.

Figure 2D:
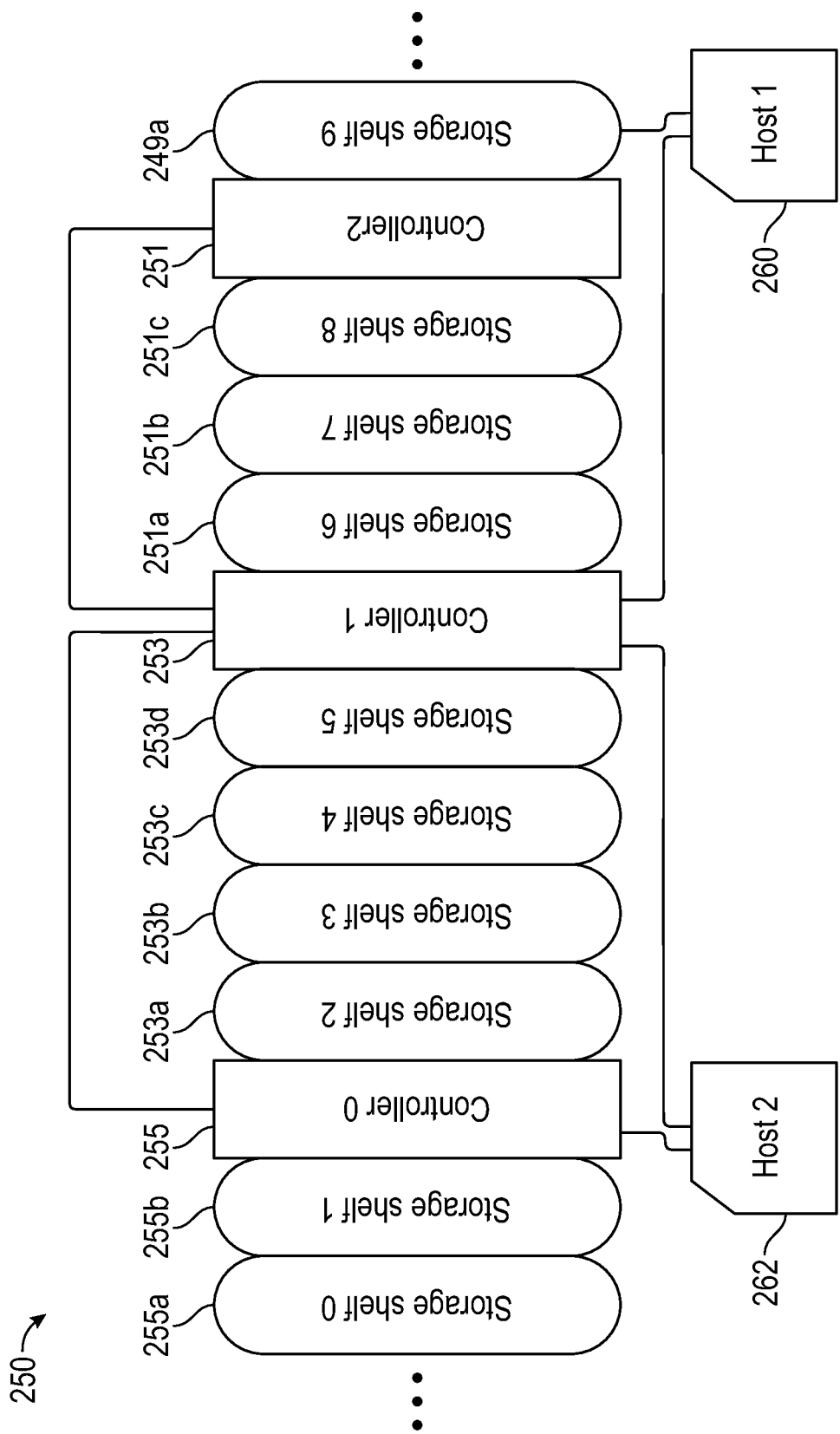
FIG. 2D shows an exemplary logical interconnection of storage controllers to form the storage cluster shown in FIG. 2C according to one embodiment.

FIG. 2D shows an exemplary logical interconnection of storage controllers to form storage cluster 250 shown in FIG. 2C. Host-1 260 and host-2 262 are shown as each being coupled to a plurality of storage controllers. Referring to FIG. 2D, host-1 260 is coupled to storage controllers 251 and 253, and host-2 262 is coupled to storage controllers 253 and 255. As described in this example, the shelves that are positioned between storage controller 251 and storage controller 253, and between storage controller 253 and storage controller 255 are accessible from both storage controllers. The interconnection of storage arrays (via storage controllers) to form cluster 250 is transparent to host-1 260 and host-2 262. For example, although host-1 is not attached to storage shelf-1 255*b*, a request for data on shelf-1 255*b* by host-1, made via storage controller-2 251, will appear the same as a request for data located on storage shelves 251*a*-251*c*. In one embodiment, in such case, the request can be forwarded from storage controller 251, via intermediate controller 253, to storage controller 255 (which can then service the request). It should be appreciated that each of these storage controllers have access to the global metadata described above and thus understand how to direct the forwarding of such I/O requests (the metadata maps the path along which the I/O requests can be forwarded by the controllers). In some embodiments, the metadata contains information that indicates, which volume of data is on which array, and which volume of data is directly controlled by which primary controller.

The status of a storage controller of storage cluster 250 as a primary or secondary controller with respect to other storage controllers of storage cluster 250 can be varied. For example, storage controller 251 and storage controller 255 can operate as primary controllers when storage controller 253 operates as a secondary controller. Furthermore, storage controller 253 can operate as a primary controller when storage controller 251 and storage controller 255 operate as secondary controllers in some embodiments. Additionally, storage controller 251 can operate as a primary controller when storage controller 253 and storage controller 255 operate as secondary controllers. Storage controller 255 can operate as a primary controller when storage controller 253 and storage controller 251 operate as secondary controllers. In one embodiment, the status of a storage controller of storage cluster 250 as a primary or secondary controller can be determined by a cycling protocol, where controllers of the cluster are cycled as a primary and secondary controller. Many variants and permutations exist for the designation of primary and secondary controllers. In addition, a storage array may be defined across any pre-defined boundaries among the controllers and shelves. As illustrated above, a pair of storage arrays can be defined to have three controllers where one of the controllers is shared as a secondary controller between the pair of storage arrays. Again, many variants of the storage arrays and the sharing of a secondary controller among multiple storage arrays may be devised as the embodiments are presented as an example and not meant to be limiting.

Figure 2E:
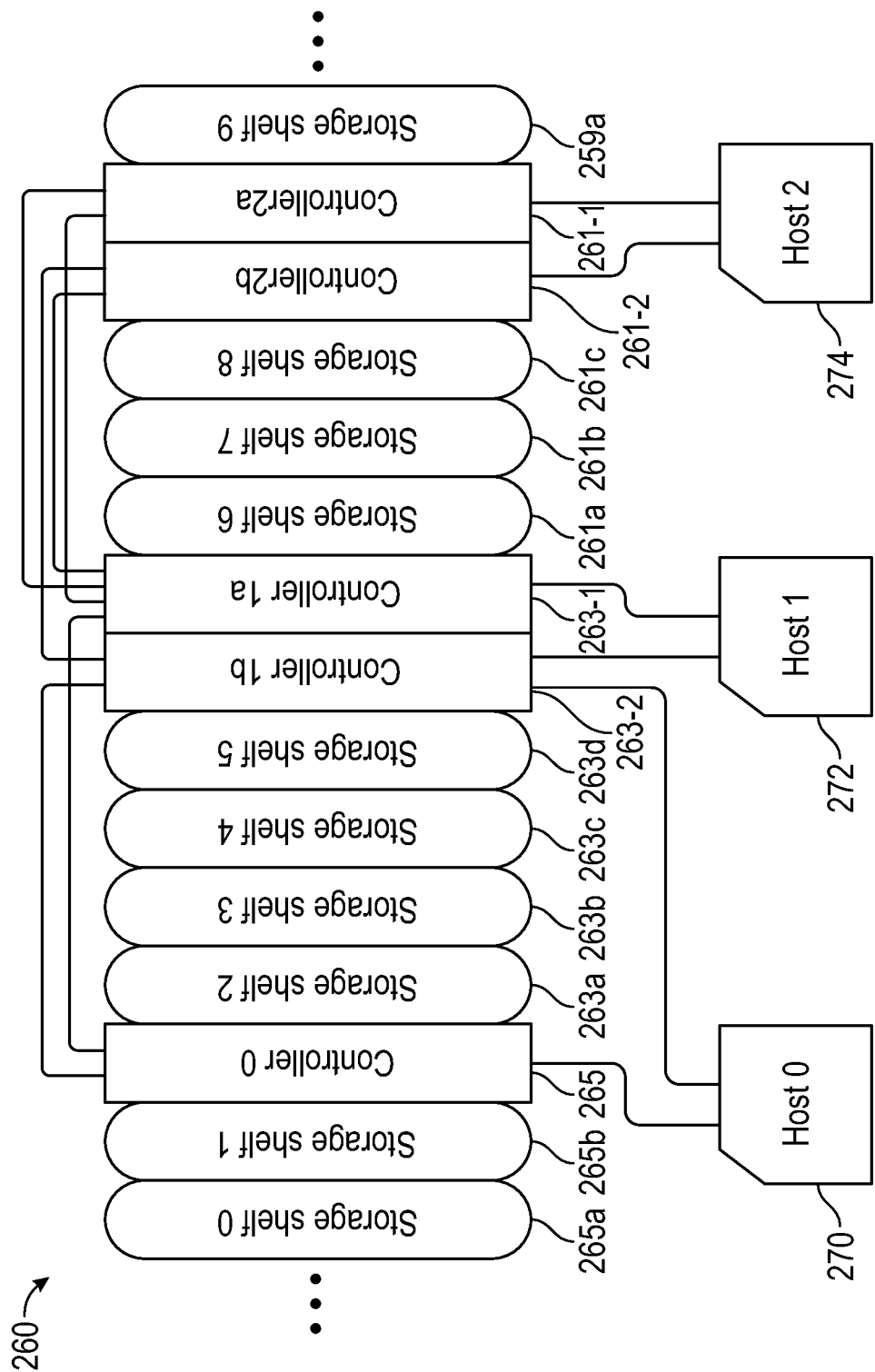
FIG. 2E shows an exemplary embodiment that illustrates another use of high availability controller pairs in the formation of a storage cluster according to one embodiment.

FIG. 2E shows an exemplary embodiment that illustrates another use of high availability controller pairs in the formation of a storage cluster 260 according to one embodiment. Storage cluster 260 includes storage controllers 261-1 and 261-2, 263-1 and 263-2 and 265. In the logical representation of FIG. 2E, each storage controller or set of storage controllers in storage cluster 260 has one or more storage shelves positioned at each of their sides. Host-0 270, host-1 272 and host-2 274 are shown as each being coupled to multiple (but not all) storage controllers in storage cluster 260. Storage controllers 261-1 and 261-2 have shelf 259*a* and shelves 261*a*-261*c*, respectively, positioned at a first and a second side, storage controllers 263-1 and 263-2 have shelves 261*a*-261*c* and shelves 263*a*-263*d*, respectively, positioned at a first and a second side and storage controller 265 has shelves 263*a*-263*d* and shelves 265*a*-265*b*, respectively, positioned at a first and a second side. In the FIG. 2E embodiment, the storage controllers of high availability storage controller pairs 261-1 and 261-2 and 263-1 and 263-2 are logically connected such that they each function as a primary controller for a first storage array and secondary controller for a second storage array (as does storage controller 265).

Figure 2F:
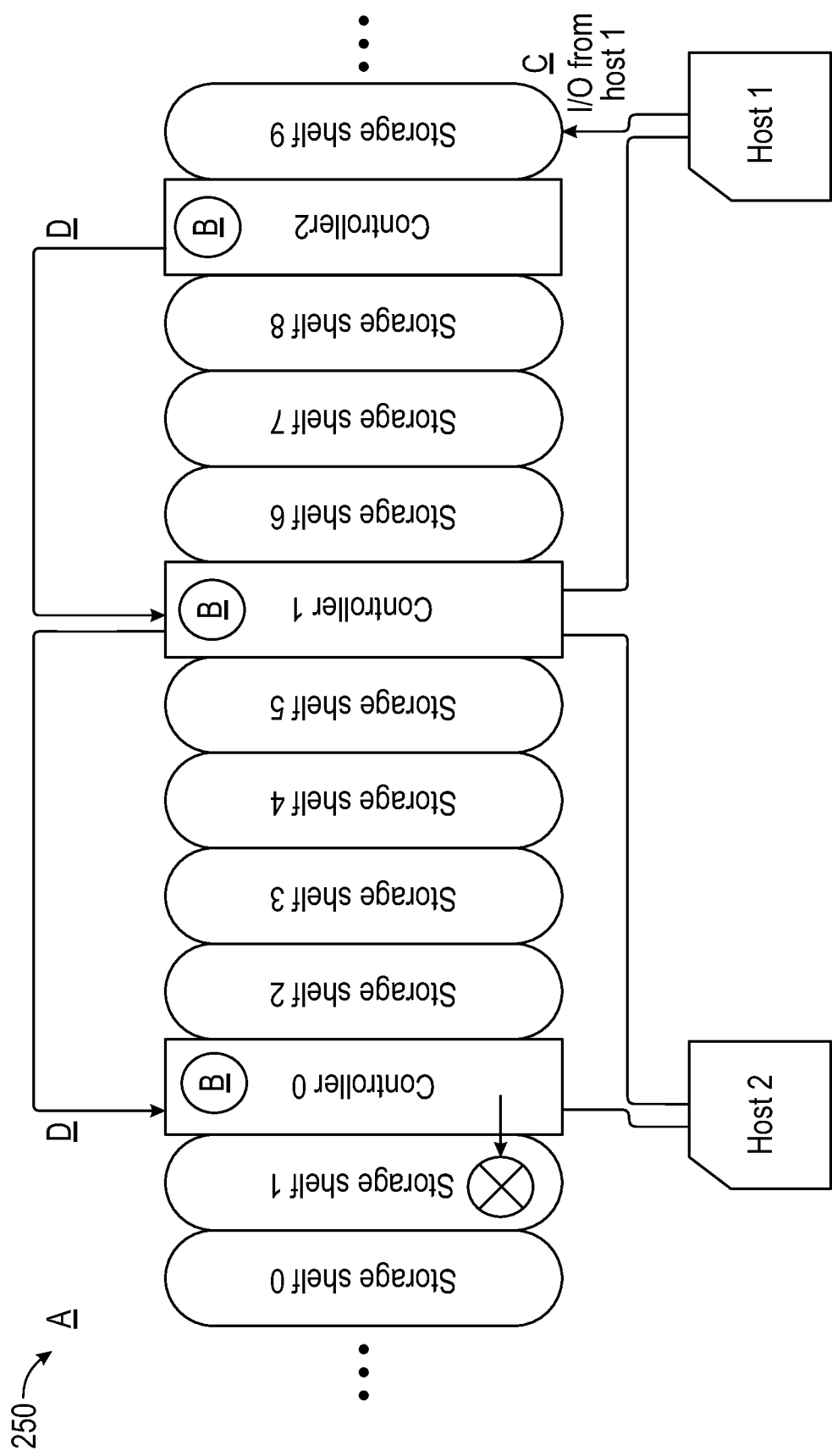
FIG. 2F illustrates exemplary operations of a system for operating a storage system according to one embodiment.

FIG. 2F illustrates aspects of operating a storage array according to one embodiment. However, it should be appreciated that other operations that are not illustrated in FIG. 2F can be performed in accordance with one embodiment. At A, a storage cluster is determined from among storage arrays of a storage system. For example, a storage cluster can be determined by selecting a set of storage arrays from among storage arrays that are a part of storage system to form storage cluster 250. At B, the storage controllers in storage cluster 250 are configured to function as both a primary controller for a first storage array and a secondary controller for a second storage array. For example, as shown in FIG. 2F (encircled Bs), storage controller 0, storage controller 1 and storage controller 2, of storage cluster 250 are configured to function as both a primary controller for a first storage array and a secondary controller for a second storage array. As noted above, many other variants of storage controllers and storage shelves within a storage array are possible. At C, an I/O request associated with a second storage controller (controller 0) is received at a first storage controller (controller 2). The I/O request is directed to a storage entity (volumes, snapshots, etc.) that is stored in a storage shelf of a storage array associated with the second controller (see encircled X in storage shelf 1). As shown in FIG. 2F, an I/O request (shown in FIG. 2F as being sent from host 1 to controller 2) directed to a storage entity X located at storage shelf 1 that is associated with controller 0, is received by controller 2.

At D of FIG. 2F, the first storage controller (controller 2) forwards the I/O request to the second storage controller (controller 0). As shown in FIG. 2F, the I/O request is forwarded from first storage controller, controller 2, to the second storage controller, controller 0, via an intermediate storage controller, controller 1. More specifically, after the I/O request is received by controller 2, it is forwarded by controller 2 to controller 1, and from controller 1 to controller 0 (see arrows leading out of controller 2 and controller 1). In one embodiment, the number of relay events that are involved in forwarding the I/O request from the first storage controller to the second storage controller are tracked and/or recorded. It should be appreciated that the forwarding of I/O requests such as described with reference to FIG. 2F is transparent to the hosts.

In one embodiment, as is described in detail herein, a first storage controller can serve as secondary controller for a first storage array while also acting as primary controller for a second storage array. If the primary controller of the first storage array fails, the first storage controller may be required to act as primary for the first and second storage arrays. When this happens, the system can re-stabilize itself by having the first storage array fail over back to its original primary controller as soon as that controller becomes available again.

Moreover, in one embodiment, when a storage controller acts as secondary controller for multiple storage arrays, a failover of one storage array onto the shared secondary controller will not create a situation where more than a single storage controller acts as primary controller for two storage arrays. After such a failover, the system may stabilize itself back to the original condition by initiating a failover back to the storage controller that failed.

Figure 3A:
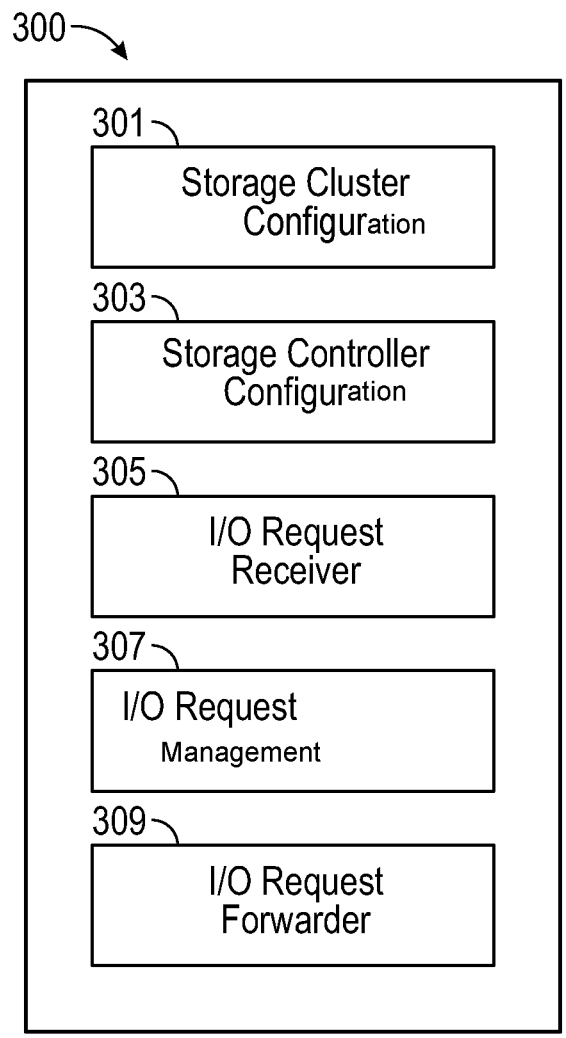
FIG. 3A shows components of a system for operating a storage system according to one embodiment.

FIG. 3A shows components of a system 300 for operating a storage array according to one embodiment. In one embodiment, the components of system 300 implement an algorithm for operating a storage array. The components of system 300 include storage cluster configuration 301, storage controller configuration 303, input/output (I/O) request receiver 305, I/O request management 307 and I/O request forwarder 309. Storage cluster configuration 301 determines the storage arrays of a storage system that are included in a storage cluster. In one embodiment, the storage arrays are logically associated to form an ordered sequence or chain of storage arrays in some embodiments. The storage arrays in the determined storage cluster include at least two storage controllers and at least one storage shelf.

Storage controller configuration 303 configures each of the controllers of the determined storage cluster (e.g., 250 in FIG. 2F) to function as both a primary controller for a first storage array and a secondary controller for a second storage array. In one embodiment, the secondary controller is configured to be shared by multiple primary controllers. And, the secondary controller may be shared by more than one storage array.

I/O request receiver 305 accesses the I/O requests that are received by storage controllers of the storage cluster. I/O request management 307 determines if an I/O request that has been received by a storage controller is associated with a storage controller that is different from the storage controller that received it. In one embodiment, I/O request management 307 can determine that an I/O request is associated with a storage controller that is different from the storage controller that received it if the I/O request is directed to a storage entity residing on a storage shelf associated with a different storage controller. I/O request management 307 can generate an I/O forwarding path based on the global metadata.

I/O request forwarder 309 causes the I/O request to be forwarded to the storage controller that the I/O request is actually associated with. In one embodiment, the forwarding of an I/O request can involve one or more relay events. As described herein, such relay events can be counted, where the number of counted relay events is stored. In one embodiment, data related to counted relay events associated with an I/O request can be added to global metadata.

It should be appreciated that the components of system 300 can be implemented in hardware or software or in a combination of both. In one embodiment, components and operations of system 300 can be encompassed by components and operations of one or more computer components and/or application programs (e.g., an operating system). In another embodiment, components and operations of system 300 can be separate from the aforementioned one or more computer components but can operate cooperatively with components and operations thereof.

Figure 3B:
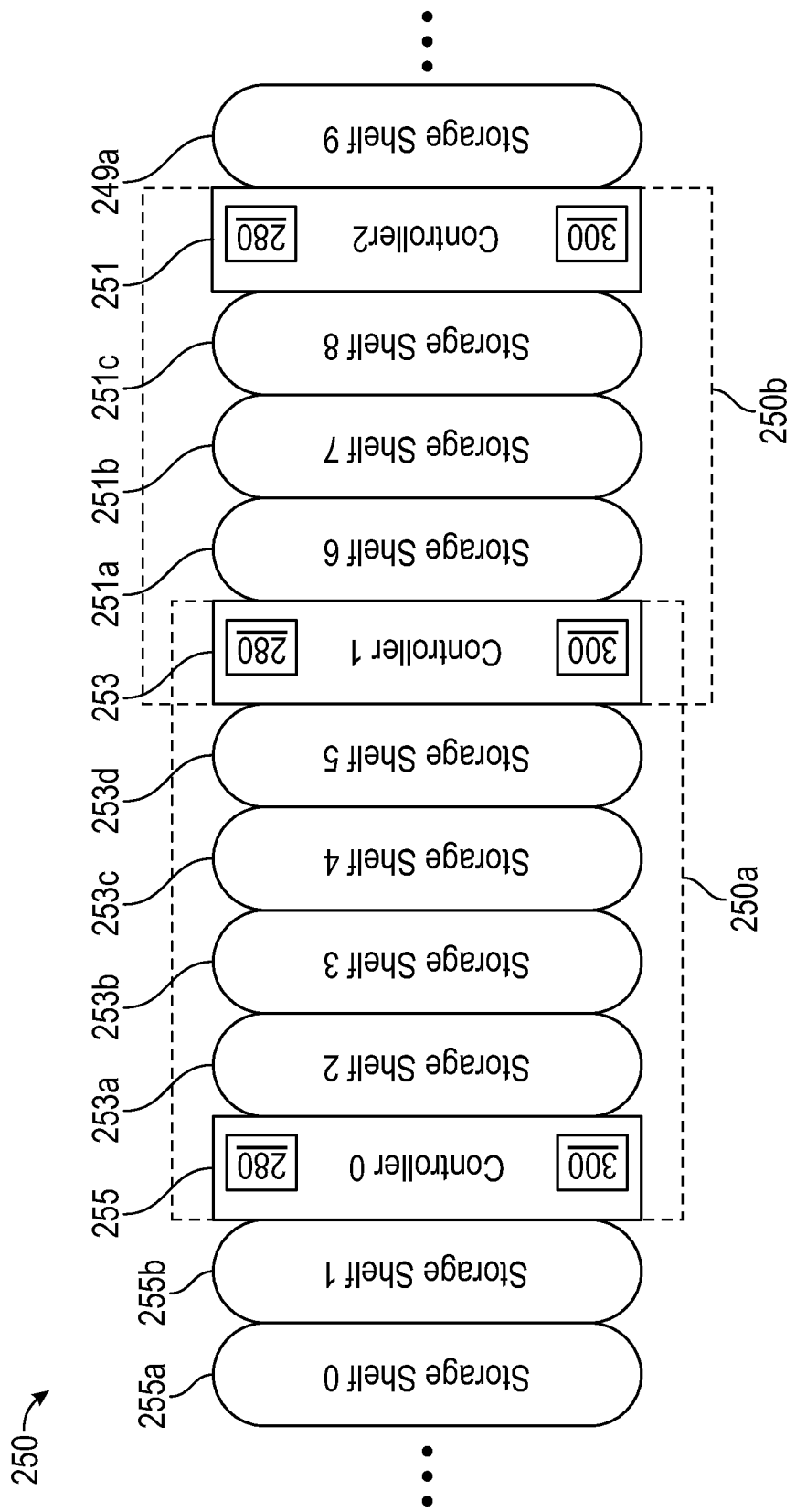
FIG. 3B shows an exemplary deployment of a system for operating a storage system in a storage cluster according to one embodiment.

FIG. 3B shows an exemplary deployment of system 300 in storage cluster 250 of FIG. 2C according to one embodiment. In one embodiment, the components of system 300 can be a part of an operating system or can be separate from the operating system but operate in conjunction therewith. In one embodiment, an instance of system 300 can reside on each of the storage controllers (e.g., 251, 253 and 255) that are a part of a storage cluster. In particular, system 300 can access locally stored global metadata 280 to enable I/O forwarding. In the FIG. 3B embodiment, global metadata 280 is replicated across data storage cluster 250. In particular, a copy of global metadata 280 is stored on each of the controllers 251, 253 and 255 of storage arrays 250a and 250b. Global metadata 280 includes mappings that relate storage entities (volumes, snapshots, etc.) of storage cluster 250 to the storage array that manages them. In the FIG. 3B embodiment, as a part of system 300, I/O request association determiners (e.g., 307 in FIG. 3A) and I/O request forwarders (e.g., 309 in FIG. 3A) reside on storage controllers 251, 253 and 255 of storage cluster 250. In operation, as a part of the forwarding of an I/O request, an I/O request association determiner can access the local copy of global metadata to determine where the I/O request should be forwarded, and an I/O request forwarder can manage the forwarding of the I/O request.

Figure 4:
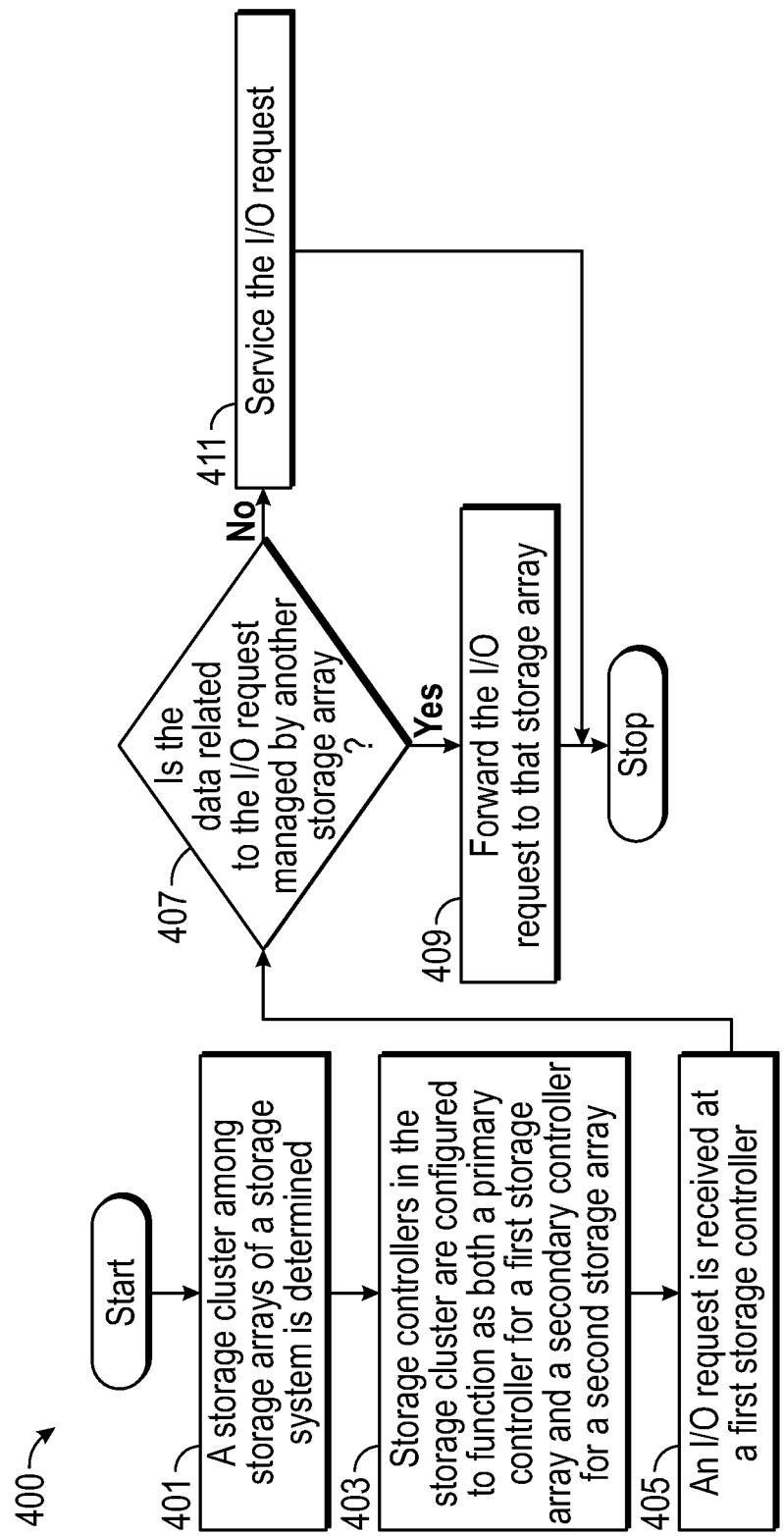
FIG. 4 is a flowchart of a method for operating a storage system according to one embodiment.

FIG. 4 shows a flowchart 400 of a method for operating a storage system according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart.

Referring to FIG. 4, at 401 a storage cluster among storage arrays of a storage system is determined. At 403, storage controllers in the storage cluster are configured to function as both a primary controller for a first storage array and a secondary controller for a second storage array. At 405, an I/O request is received at a first storage controller of a first storage array. At 407, it is determined if a storage entity related to the I/O request is managed by another storage array in the storage cluster. It should be appreciated that this determination may be achieved by referencing the global metadata mentioned above. At 409, if the storage entity related to the I/O request is managed by another storage array the I/O request is forwarded to that storage array. At 411, if the storage entity related to the I/O request is not managed by another storage array, the I/O request is serviced by the controller that received the I/O request.

As described herein, in some embodiments, various relationships and features of the disclosed storage clusters, storage arrays, storage controllers, storage shelves and storage devices obtain. For example, in exemplary embodiments, there is a one to two or more relationship between a storage cluster and its storage arrays. Moreover, there is a one to two relationship between a storage array and its storage controllers. In addition, a storage array can have one or more storage shelves and each storage shelf can include one or more storage devices. As described previously, each storage controller of a storage array has access to the shelves of that storage array. In particular, each storage controller of a storage array can act as either primary or secondary for that storage array at a given time. Furthermore, a storage controller can act as a secondary for multiple storage arrays and as a primary for multiple storage arrays.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    reducing a number of relay events for one or more I/O requests by reassigning a first controller of a high availability controller pair to handle a request that is assigned to a second controller of the high availability pair, the reducing based on accessing metadata replicated across storage arrays including a storage array associated with the high availability controller pair.

2. The method of claim 1 wherein the secondary controller is shared by multiple primary controllers of differing storage arrays.

3. The method of claim 1 wherein the secondary controller is shared by more than one storage array.

4. The method of claim 1 further comprising:
    tracking the I/O requests; and
    forwarding the I/O requests based on accessing the metadata.

5. The method of claim 1 further comprising:
    receiving an I/O request at the first controller;
    determining the I/O request is associated with second controller; and
    forwarding the I/O request to the second controller.

6. The method of claim 1 further comprising:
    suggesting actions to reduce the number of relay events, wherein the actions include at least one from a set consisting of migrating a volume from one storage array to another, adding storage capacity to a storage array, removing storage capacity from a storage array, and changing cabling for relay minimization purposes.

7. The method of claim 1 wherein the reducing the number of relay events for one or more I/O requests comprises:
    modifying metadata replicated across storage arrays; and
    communicating the modified metadata across the storage arrays.

8. A storage system, comprising:
    a first controller and a second controller arranged in a high availability configuration for a first storage array of multiple storage arrays of the storage system; and
    the first controller and the second controller configured to reduce a number of relay events for one or more I/O requests by reassigning the first controller to handle a request that is assigned to the second controller based on accessing metadata replicated across the storage arrays.

9. The storage system of claim 8 wherein the secondary controller is shared by multiple primary controllers of differing storage arrays.

10. The storage system of claim 8 wherein the secondary controller is shared by more than one storage array.

11. The storage system of claim 8 wherein the first and second controllers are configured to:
    track the I/O requests; and
    forward the I/O requests based on accessing the metadata.

12. The storage system of claim 8 wherein an I/O request that is received at the first controller is forwarded to the second controller if it is determined that the I/O request is associated with the second controller.

13. The storage system of claim 8, wherein the first and second controllers are configured to suggest actions to reduce the number of relay events based on the first component, wherein the actions include at least one from a set consisting of migrating a volume from one storage array to another, adding storage capacity to a storage array, Of removing storage capacity from a storage array, and changing cabling for relay minimization purposes.

14. The storage system of claim 8 wherein reduction of the number of relay events for at least one I/O request comprises modifying metadata replicated across the storage arrays, and communicating the modified metadata across the storage arrays.

15. A non-transitory computer-readable storage medium having program instructions stored thereon, which when executed by at least one processor, cause the at least one processor to perform a method comprising:
    reducing a number of relay events for one or more I/O requests by reassigning a first controller of a high availability controller pair to handle a request that is assigned to a second controller of the high availability pair, the reducing based on accessing metadata replicated across storage arrays including a storage array associated with the high availability controller pair.

16. The medium of claim 15 wherein the secondary controller is shared by multiple primary controllers of differing storage arrays.

17. The medium of claim 15 wherein the secondary controller is shared by more than one storage array.

18. The medium of claim 15 wherein the method further comprises:
    tracking the I/O requests; and
    forwarding the I/O requests based on accessing the metadata.

19. The medium of claim 15 wherein the method further comprises:
    receiving an I/O request at the first controller;

determining the I/O request is associated with the second controller; and forwarding the I/O request to the second controller.

* * * * *